United States Patent
Ahn et al.

(10) Patent No.: US 7,979,631 B2
(45) Date of Patent: Jul. 12, 2011

(54) METHOD OF PREFETCHING DATA IN HARD DISK DRIVE, RECORDING MEDIUM INCLUDING PROGRAM TO EXECUTE THE METHOD, AND APPARATUS TO PERFORM THE METHOD

(75) Inventors: Seong-jun Ahn, Seoul (KR); Hyung-gyu Lee, Seoul (KR); Jung-hwan Kim, Seoul (KR); Young-bong Kim, Seoul (KR); Sine Kim, Pohang-si (KR); Young-il Seo, Suwon-si (KR); Chan-ho Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 545 days.

(21) Appl. No.: 12/174,661

(22) Filed: Jul. 17, 2008

(65) Prior Publication Data
US 2009/0089501 A1  Apr. 2, 2009

(30) Foreign Application Priority Data
Sep. 28, 2007  (KR) .................. 10-2007-0098360

(51) Int. Cl.
*G06F 12/08*  (2006.01)

(52) U.S. Cl. .................. 711/113; 711/112; 711/118
(58) Field of Classification Search .................. None
See application file for complete search history.

(56) References Cited

U.S. PATENT DOCUMENTS

| | | | |
|---|---|---|---|
| 6,684,294 B1 * | 1/2004 | Huffman | 711/112 |
| 7,159,073 B2 * | 1/2007 | Longo et al. | 711/113 |
| 7,640,425 B2 * | 12/2009 | Kasuga | 713/1 |
| 2004/0042112 A1 * | 3/2004 | Stence et al. | 360/69 |
| 2006/0026345 A1 * | 2/2006 | Nishimoto et al. | 711/114 |

FOREIGN PATENT DOCUMENTS

| | | |
|---|---|---|
| JP | 2003-167781 | 6/2003 |
| JP | 2004-78453 | 3/2004 |
| KR | 2001-87110 | 9/2001 |
| KR | 2005-57006 | 6/2005 |

* cited by examiner

*Primary Examiner* — Than Nguyen
(74) *Attorney, Agent, or Firm* — Stanzione & Kim, LLP

(57) ABSTRACT

A method of prefetching data in a hard disk drive includes searching for a logic block address (LBA) of data requested by an external apparatus in a history of a non-volatile cache of the hard disk drive, and if the LBA of the data is stored in the history, storing data recorded in a LBA stored after the LBA of the data requested by the external apparatus from among LBAs stored in the history in a buffer of the hard disk drive.

13 Claims, 2 Drawing Sheets

METHOD OF PREFETCHING DATA IN HARD DISK DRIVE, RECORDING MEDIUM INCLUDING PROGRAM TO EXECUTE THE METHOD, AND APPARATUS TO PERFORM THE METHOD

CROSS-REFERENCE TO RELATED APPLICATIONS

This application claims priority under 35 U.S.C. §119(a) from Korean Patent Application No. 10-2007-0098360, filed on Sep. 28, 2007, in the Korean Intellectual Property Office, the disclosure of which is incorporated herein in its entirety by reference.

BACKGROUND OF THE INVENTION

1. Field of the Invention

The present general inventive concept relates to a method of prefetching data in a hard disk drive, and a recording medium and apparatus therefore, and more particularly, to a method of prefetching data in a hard disk drive using an advanced technology attachment (ATA) command about a non-volatile cache of an external apparatus, a recording medium having recorded thereon a program to execute the method, and an apparatus to perform the method.

2. Description of the Related Art

Since a flash memory does not contain parts that physically move, a flash memory has advantages of quick random read times and low power consumption. Using such advantages of a flash memory, a hybrid hard disk drive, which additionally includes a non-volatile cache formed of a flash memory along with a conventional hard disk, has been recently developed. The non-volatile cache performs a function of temporarily storing information about a logic block address (LBA) that is to be stored in a platter of the hard disk.

The hybrid hard disk drive has the following advantages compared to a conventional hard disk drive.

First, booting time of an operating system installed in the hybrid hard disk drive can be reduced. That is, the booting time can be reduced by copying files required for booting the operating system to the non-volatile cache, and using the files while booting the operating system. A conventional hard disk drive requires time to rotate a spindle motor up to a prescribed speed while resetting power of the operating system. However, since a host, which uses the hybrid hard disk, can read the files not from the hybrid hard disk but from the non-volatile cache, the booting time can be reduced.

Second, data access time can be reduced. That is, the host records data to be recorded both in the non-volatile cache and the hybrid hard disk. Accordingly, when data is read, the non-volatile cache is first searched for the data, and when the data is recorded, the data is read from the non-volatile cache. Considering that recently recorded data has high access possibility, the data access time can be reduced by using the non-volatile cache.

A method of prefetching data in a hard disk drive is a technology of pre-storing data, which is expected to be accessed in the near future, in a buffer and quickly processing a data access request. In a conventional hard disk drive, prefetching is performed by using only a spatial locality. A hard disk drive performs prefetching when a determination is made that a request of the host has a spatial locality. That is, the hard disk drive performs prefetching when data, which is requested to be read by the host, i.e. sectors have continuous logical block addresses (LBAs), and when a number of sectors is equal to or greater than a predetermined number. Data that is to be prefetched is also determined based on a spatial locality. That is, continuous pieces of data in the last LBA that is requested to be read by the host are read and stored in the buffer. An effect of prefetching is illustrated only when the host sequentially reads a massive amount of data, and prefetching cannot be performed when the host randomly accesses the hard disk drive.

SUMMARY OF THE INVENTION

The present general inventive concept provides a method of prefetching data in a hard disk drive to effectively perform prefetching even when an external apparatus requests data randomly, by using a non-volatile cache management command of the external apparatus, a recording medium having embodied thereon a computer program to execute the method, and an apparatus to perform the method.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a method of prefetching data in a hard disk drive. The method includes searching for a logic block address (LBA) of data requested by an external apparatus in a history of a non-volatile cache of the hard disk drive, and if the LBA of the data is stored in the history, storing data recorded in a respective LBA stored after the LBA of the data requested by the external apparatus from among LBAs stored in the history in a buffer of the hard disk drive.

The method may further include, when a predetermined LBA store command is received from the external apparatus, storing the LBA in the non-volatile cache, and storing the LBA in the history of the non-volatile cache.

The method may further include, when the external apparatus requests data, searching is performed for the data in the buffer such that if the data exists in the buffer, transmitting the data to the external apparatus, if the data does not exist in the buffer, searching for the data in the non-volatile cache, if the data exists in the non-volatile cache, transmitting the data to the buffer, and if the data does not exist in the non-volatile cache, transmitting the data from the hard disk drive to the buffer.

The external apparatus and the hard disk drive may communicate through an advanced technology attachment (ATA) interface.

The non-volatile cache may illustrate a flash memory.

The foregoing and/or other aspects and utilities of the general inventive concept may also be achieved by providing a computer-readable recording medium. The computer-readable recording medium has embodied thereon a computer program to execute a method, the method includes searching for a LBA of data requested by an external apparatus in a history of a non-volatile cache of the hard disk drive, and if the LBA of the data is stored in the history, storing data recorded in a respective LBA stored after the LBA of the data requested by the external apparatus from among LBAs stored in the history in a buffer of the hard disk drive.

The foregoing and/or other aspects and utilities of the general inventive concept may also be achieved by providing a hard disk drive usable with an external apparatus. The hard disk drive includes a buffer, a non-volatile cache, and a hard disk, a controller to transmit data requested by the external apparatus to the external apparatus by searching for the data in at least one of the buffer, the non-volatile cache, and the hard disk, wherein the controller searches for a LBA of the data requested by the external apparatus in a history of the non-volatile cache, and if the LBA is stored in the history, stores data recorded in a respective LBA stored after the LBA of the data requested by the external apparatus from among LBAs stored in the history in the buffer.

The foregoing and/or other aspects and utilities of the general inventive concept may also be achieved by providing a hard disk drive system increasing an advanced technology attachment (ATA) interface, a hard disk drive including a non-volatile cache, and an external apparatus to communicate with the hard disk drive through the ATA interface including transmitting commands, storing one or more logical block addresses (LBAs) in the non-volatile cache, removing the one or more stored LBAs from the non-volatile cache, and checking a list of the one or more stored LBAs in the non-volatile cache.

The foregoing and/or other aspects and utilities of the general inventive concept may also be achieved by providing a hard disk drive usable with an external apparatus, the hard disk drive increasing a non-volatile cache to store a first set of data, a hard disk to store a second set of data, a buffer to store preread data from one of the first set of data and the second set of data to be requested by the external apparatus, and a controller to transmit to the external apparatus the preread data requested by the external apparatus.

The buffer may store write request data of the external apparatus.

The buffer may store data previously transmitted to the external apparatus.

The foregoing and/or other aspects and utilities of the general inventive concept may also be achieved by providing a method of storing a logical block address (LBA) in a hard disk drive, the method including receiving a predetermined LBA store command from an external apparatus, storing a LBA corresponding to the predetermined LBA store command in a non-volatile cache of the hard disk drive, and storing the LBA in a history of the non-volatile cache.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
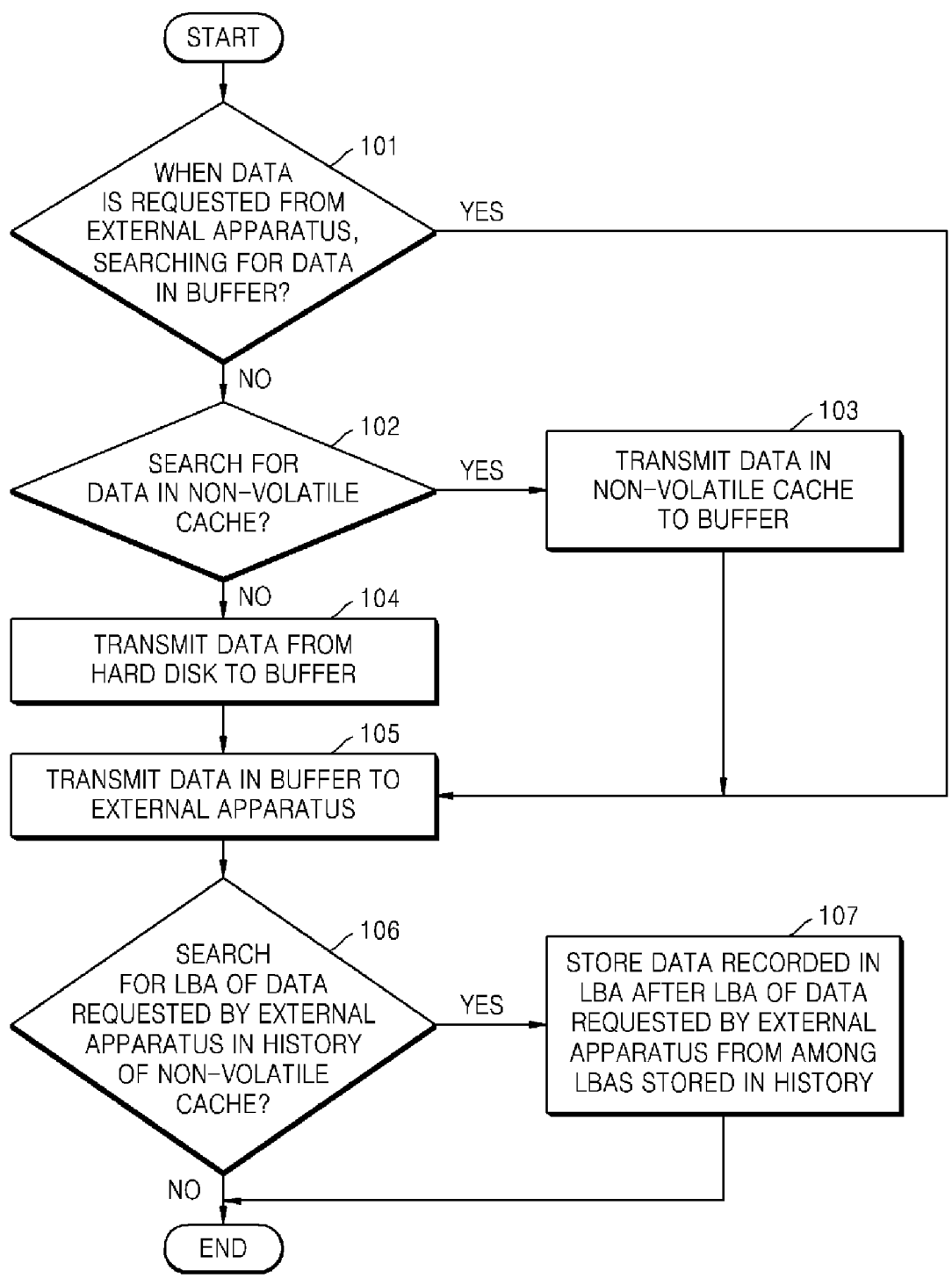
FIG. 1 is a flowchart illustrating a method of prefetching data in a hard disk drive, according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a flowchart illustrating a method of prefetching data in a hard disk drive, according to an embodiment of the present general inventive concept.

Figure 3:
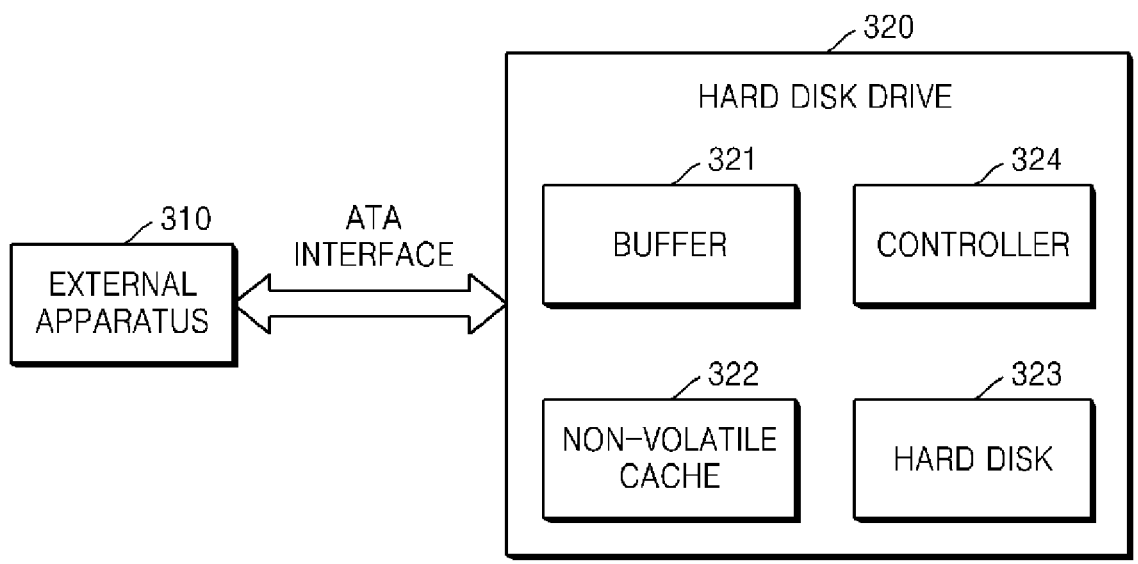
FIG. 3 is a block diagram illustrating a hard disk drive to prefetch data, according to an embodiment of the present general inventive concept.

Referring to FIGS. 1 and 3, in operation 101, an external apparatus 310 requests data and the data is searched for in a buffer 321. If the data exists in the buffer 321, operation 105 is performed and if the data does not exist in the buffer 321, operation 102 is performed.

The buffer 321 is a memory to perform as a cache memory as stored in a main board or a central processing unit (CPU) in the hard disk drive 320. The buffer 321 in the hard disk drive 320 can be used for three purposes, namely, writing, reading and prefetching. When the buffer 321 is used as a write buffer, write request data of the external apparatus 310 is stored only in the buffer 321. When the buffer 321 is used as a read buffer, the buffer 321 stores data that is transmitted to the external apparatus 310, and when the same data is requested to be read, the data is read from the buffer 321 instead of a hard disk 323. When the buffer 321 is used as a prefetch buffer, data that is expected to be requested by the external apparatus 310 in the near future is pre-read from the hard disk 323 or a non-volatile cache 322, and stored in the buffer 321. When the external apparatus 310 requests such stored data, the data can be quickly read from the buffer 321. In most embodiments, one or a combination of the three purposes described above is used. Searching for data refers to searching for a location of the data in order to read or write the data.

If the data does not exist in the buffer 321, the data is searched for in non-volatile cache 322 in operation 102. If the data exists in the non-volatile cache 322, operation 103 is performed and if the data does not exist in the non-volatile cache 322, operation 104 is performed. The non-volatile cache 322 may be a flash memory.

If the data exists in the non-volatile cache 322, the data is transmitted to the buffer 321 in operation 103.

If the data does not exist in the non-volatile cache 322, the data is transmitted from the hard disk 323 to the buffer 321 in operation 104.

In operation 105, the buffer 321 transmits the data to the external apparatus 310.

In operation 106, a logic block address (LBA) of the data requested by the external apparatus 310 is searched for in a history of the non-volatile cache 322.

The history denotes a database or documents in which changes of data or files are recorded in a file system. In the current embodiment, the history denotes an object to store LBAs of data requested to be stored in the non-volatile cache 322 by the external apparatus 310 in a request order. A method of storing a LBA in the history will now be described with reference to FIG. 2.

Figure 2:
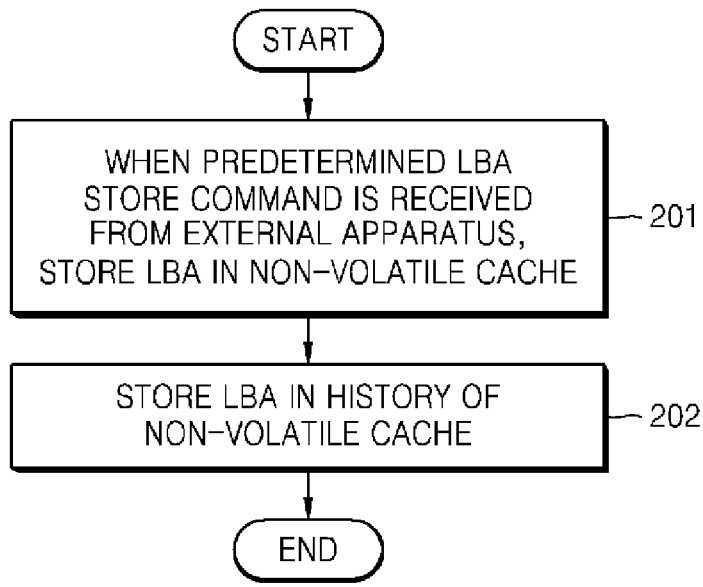
FIG. 2 is a flowchart illustrating a method of storing a logic block address (LBA) in a history of a non-volatile cache, according to an embodiment of the present general inventive concept.

FIG. 2 is a flowchart illustrating a method of storing a LBA in a history of a non-volatile cache 322 (FIG. 3), according to an embodiment of the present general inventive concept. Operations of FIG. 2 can be performed before, simultaneously with, or after operations of FIG. 1.

Referring to FIGS. 2 and 3, when a predetermined LBA store command is received from the external apparatus 310, the predetermined LBA is stored in the non-volatile cache 322 in operation 201. The external apparatus 310 assigns a LBA of the data to be stored in the non-volatile cache 322 to the hard disk drive 320 by using an extended advanced technology attachment (ATA) command. An ATA is a type of a hard disk drive interface. Extended ATA commands required for the external apparatus 310 to manage the non-volatile cache 322 of the hard disk drive 320 are specified in AT Attachment 8—ATA/ATAPI Command Set specification. By using the extended ATA commands specified in AT Attachment 8—ATA/ATAPI Command Set specification, the external apparatus 310 can store a LBA in the non-volatile cache 322, remove a stored LBA from the non-volatile cache 322, and check a list of LBAs currently stored in the non-volatile cache 322. Here, a command used to store a LBA in the non-volatile cache 322 is "ADD LBA(S) TO NV CACHE PINNED SET DMA EXT" (hereinafter, referred to as an ADD LBA command). The ADD LBA command transmitted from the external apparatus 310 to the hard disk drive 320 includes information about interconnectivity of LBAs. That is, the external apparatus 310 stores LBAs having similar purposes in the non-volatile cache 322 through at least one continuous ADD LBA command. Accordingly, the LBAs stored in the non-volatile cache have high possibility of being accessed at the same time. For example, when LBAs, which are accessed during booting to reduce the booting time, are stored in the non-volatile cache 322, the external apparatus 310 stores LBAs of a master boot record (MBR), a boot sector, a kernel image, an apparatus manager, etc., which are accessed during the booting, in the non-volatile cache 322 through a plurality of continuous ADD LBA commands. The LBAs stored in the non-volatile cache 322 are simultaneously accessed during the booting.

In operation 202, the LBA is stored in the history of the non-volatile cache 322. Operation 202 may be performed after operation 201 or simultaneously with operation 201.

Table 1 illustrates examples of ADD LBA commands of the external apparatus 310.

TABLE 1

| Request of External Apparatus | Operation of Non-volatile Cache |
|---|---|
| ADD LBA [100,10] | Cache[100,10] in Non-volatile Cache, Save history [100,10] |
| ADD LBA [200,5] | Cache[200,5] in Non-volatile Cache, Save history [200,5] |

Referring to Table 1, 'ADD LBA [100,10]' denotes a command to store 10 sectors from LBA 100. Also, 'Cache [100, 10] in Non-volatile Cache, Save history [100, 10]' denotes that the 10 sectors from LBA 100 are temporarily stored in the non-volatile cache 322 and stored in the history.

Table 2 illustrates a state of the history after performing the ADD LBA command.

TABLE 2

| Saving History |
|---|
| [100,10] |
| [200,5] |

Alternatively, the history may be formed in a tree form.

When the LBA of the requested data is stored in the history, data recorded in a LBA after the LBA of the requested data from among the LBAs stored in the history is stored in the buffer 321 in operation 107. Operation 107 is the prefetching operation. Generally, the prefetching can be performed in parallel with an operation of transmitting data to the external apparatus 310. Also, when the prefetching consumes a long time, a previous request of the external apparatus 310 may be completed before the prefetching is completed. In this case, a new request may be received from the external apparatus 310 during the prefetching. If required, the prefetching may be stopped during the respective operation.

Table 3 illustrates examples of the prefetching in a conventional hard disk drive 320.

TABLE 3

| Request of External Apparatus | Operation of Hard Disk Drive | Transmission Data |
|---|---|---|
| Read [100,2] | Read platter [100,2] | [100,2] |
| Read [102,3] | Read platter [102,3] | [102,3] |
| Read [105,5] | Read platter [105,5] + Read platter [110,20] | [105,5] |
| Read [200,5] | Read platter [200,5] | [200,5] |

Due to spatial locality of a conventional hard disk drive 320, data, which is requested to be read by the external apparatus 310, i.e. sectors, should include continuous LBAs, and the prefetching is performed only when a number of sectors is equal to or greater than a predetermined number. Accordingly, in the present embodiment, it is assumed that a number of continuous LBAs should be equal to or greater than 10 and a number of data that are to be prefetched should be 20 in order to perform the prefetching. Also, it is assumed that a time to prefetch at least 10 sectors is provided between requests.

Referring to Table 3, 'Read [100,2]' denotes a command to read 2 sectors from LBA 100. Also, 'Read platter [100,2]' denotes that the 2 sectors from a sector corresponding to LBA 100 from a platter have been read. In Table 3, the read has been requested four times. In the first two read requests, only requested sectors are read and then transmitted to the external apparatus 310. However, in the third read request, the number of sectors that is continuously read is 10. In this case, the prefetching is performed and thus 20 more sectors are read than requested by the external apparatus 310. In Table 3, 'Read platter [110,20]' denotes the prefetching. If the fourth request of the external apparatus 310 starts from LBA 110, the prefetching is hit, and thus data can be quickly processed in the buffer 321 without accessing the hard disk 323. However, as illustrated in Table 3, when the fourth request starts from LBA 200, i.e. when the external apparatus 310 randomly accesses the hard disk 323, the prefetching cannot be performed. In this case, data stored in the buffer 321 is discarded, and thus an effect of the prefetching cannot be achieved.

Table 4 illustrates examples of the prefetching in the non-volatile cache 322 according to an embodiment of the present general inventive concept.

TABLE 4

| Request of External Apparatus | Operation of Non-volatile Cache | Transmission Data |
|---|---|---|
| Read [100,2] | Read Non-volatile Cache [100,2] + Read Non-volatile Cache [102,8] | [100,2] |
| Read [102,3] | Service from buffer + Read Non-volatile Cache [200,5] | [102,3] |
| Read [105,5] | Service from buffer | [105,5] |
| Read [200,5] | Service from buffer | [200,5] |

Referring to Table 4, 'Read [100,2]' denotes a command to read 2 sectors from LBA 100. Also, 'Read Non-volatile Cache [100,2]' denotes that 2 sectors from a sector corresponding to LBA 100 in the non-volatile cache 322 have been read. When the external apparatus 310 requests data, a LBA of the data is searched for in the history of the non-volatile cache 322. As illustrated in Table 4, the prefetching is performed since LBA 100 and LBA 101 are stored. By reading from LBA 102 to LBA 109, which are LBAs after the LBA of the requested data, data of the LBAs is stored in the buffer 321. Then, since a next request of the external apparatus 310 starts from LBA 102, such as 'Read [102,3]', the prefetching is hit, and thus the next request can be quickly processed. Also, from LBA 200 to LBA 204, which are LBAs after the LBA of the requested data, are further read, and data of the LBAs are stored in the buffer 321. Accordingly, in the third and the fourth request of the external apparatus 310, the prefetching is hit and thus the requests are quickly processed.

FIG. 3 is a block diagram illustrating a hard disk drive 320 according to an embodiment of the present general inventive concept.

Referring to FIG. 3, the hard disk drive 320 according to the current embodiment of the present general inventive concept includes a buffer 321, a non-volatile cache 322, a hard disk 323, and a controller 324.

The buffer 321 is a memory to perform as a cache memory disposed in a main board or a CPU in the hard disk drive 320. Generally, the hard disk drive 320 uses the buffer 321 to reduce a difference between a rotation speed of the hard disk 323 and a speed of data interface with an external apparatus 310. The buffer 321 may include a synchronous dynamic random access memory (SDRAM) so that data input/output can be performed quickly.

The non-volatile cache 322 temporarily stores data that is to be stored in the hard disk 323 by a request of the external apparatus 310, and records a history about LBAs. The non-volatile cache 322 may be a flash memory.

The controller 324 checks whether a read request of the external apparatus 310 can be processed in the buffer 321. If the read request can be processed in the buffer 321, the controller 324 only accesses the buffer 321 and processes the read request. If the read request cannot be processed in the buffer 321, the controller 324 accesses data stored in the hard disk 323 and processes the read request. In detail, when the external apparatus 310 requests data, the controller 324 searches for the data in the buffer 321. If the data exists in the buffer 321, the controller 324 transmits the data to the external apparatus 310, and if the data does not exist in the buffer 321, the controller 324 searches for the data in the non-volatile cache 322. If the data exists in the non-volatile cache 322, the data is transmitted to the buffer 321, and if the data does not exist in the non-volatile cache 322, the data is transmitted from the hard disk 323 to the buffer 321.

Also, the controller 324 searches for a LBA of the data requested by the external apparatus 310 in a history of the non-volatile cache 322. If a LBA of the data is stored in the history, data recorded in a LBA after the LBA of the requested data from among LBAs stored in the history is stored in the buffer 321.

Also, when the controller 324 receives a predetermined LBA store command from the external apparatus 310, the predetermined LBA is stored in the non-volatile cache 322, and the predetermined LBA is stored in the history of the non-volatile cache 322.

An interface transmits a request of the external apparatus 310 to the controller 324, controls data transmission between the external apparatus 310 and the hard disk drive 320, and transmits a result of processing a command to the external apparatus 310. In the current embodiment, an ATA interface is used.

In the present embodiment, a hard disk drive can be realized in a hybrid hard disk drive. Also, an external apparatus may be a host.

The general inventive concept can also be embodied as computer readable codes on a computer readable recording medium. The computer-readable medium can include a computer-readable recording medium and a computer-readable transmission medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices. The computer readable recording medium can also be distributed over network coupled computer systems so that the computer readable code is stored and executed in a distributed fashion. The computer-readable transmission medium can transmit carrier waves or signals (e.g., wired or wireless data transmission through the Internet). Also, functional programs, codes, and code segments for accomplishing the present general inventive concept can be easily construed by programmers skilled in the art to which the present general inventive concept pertains.

As described above, prefetching can be performed even for data that is not sequential. A non-volatile cache is faster than a hard disk, but slower than a buffer including a DRAM or SDRAM. Accordingly, when a time to access the non-volatile cache is eliminated due to the prefetching, a time required to perform a read request of the external apparatus can be remarkably reduced. The hard disk drive is assumed to operate substantially at the same speed as a storage apparatus formed of a DRAM with successful execution of prefetching operations.

While this present general inventive concept has been particularly illustrated and described with reference to preferred embodiments thereof, it will be understood by those skilled in the art that various changes in form and details may be made therein without departing from the spirit and scope of the general inventive concept as defined by the appended claims. The preferred embodiments should be considered in descriptive sense only and not for purposes of limitation. Therefore, the scope of the general inventive concept is defined not by the detailed description of the general inventive concept but by the appended claims, and all differences within the scope will be construed as being included in the present general inventive concept.

What is claimed is:

1. A method of prefetching data in a hard disk drive, the method comprising:
 searching for a logic block address (LBA) of data requested by an external apparatus in a history of a non-volatile cache of the hard disk drive; and
 if the LBA of the data is stored in the history, storing data recorded in a respective LBA stored after the LBA of the data requested by the external apparatus from among LBAs stored in the history in a buffer of the hard disk drive.

2. The method of claim 1, further comprising:
 when a predetermined LBA store command is received from the external apparatus, storing the LBA in the non-volatile cache; and
 storing the LBA in the history of the non-volatile cache.

3. The method of claim 1, further comprising:
 when the external apparatus requests data, searching is performed for the data in the buffer such that:
 if the data exists in the buffer, transmitting the data to the external apparatus;
 if the data does not exist in the buffer, searching for the data in the non-volatile cache;
 if the data exists in the non-volatile cache, transmitting the data to the buffer; and
 if the data does not exist in the non-volatile cache, transmitting the data from the hard disk drive to the buffer.

4. The method of claim 1, wherein the external apparatus and the hard disk drive communicate through an advanced technology attachment (ATA) interface.

5. The method of claim 1, wherein the non-volatile cache comprises:
   a flash memory.

6. A computer-readable recording medium having embodied thereon a computer program to execute a method, the method comprising:
   searching for a LBA of data requested by an external apparatus in a history of a non-volatile cache of the hard disk drive; and
   if the LBA of the data is stored in the history, storing data recorded in a respective LBA stored after the LBA of the data requested by the external apparatus from among LBAs stored in the history in a buffer of the hard disk drive.

7. The computer-readable recording medium of claim 6, wherein the method further comprising:
   when a predetermined LBA store command is received from the external apparatus, storing the LBA in the non-volatile cache; and
   storing the LBA in the history of the non-volatile cache.

8. The computer-readable recording medium of claim 6, wherein the method further comprising:
   when the external apparatus requests data, searching is performed for the data in the buffer such that:
     if the data exists in the buffer, transmitting the data to the external apparatus;
     if the data does not exist in the buffer, searching for the data in the non-volatile cache;
     if the data exists in the non-volatile cache, transmitting the data to the buffer; and
     if the data does not exist in the non-volatile cache, transmitting the data from the hard disk drive to the buffer.

9. A hard disk drive usable with an external apparatus, the hard disk drive comprising:
   a buffer;
   a non-volatile cache;
   a hard disk; and
   a controller to transmit data requested by the external apparatus to the external apparatus by searching for the data in at least one of the buffer, the non-volatile cache, and the hard disk,
   wherein the controller searches for a LBA of the data requested by the external apparatus in a history of the non-volatile cache, and if the LBA is stored in the history, stores data recorded in a respective LBA stored after the LBA of the data requested by the external apparatus from among LBAs stored in the history in the buffer.

10. The hard disk drive of claim 9, wherein the controller stores the LBA in the non-volatile cache when a predetermined LBA store command is received from the external apparatus, and stores the LBA in the history of the non-volatile cache.

11. The hard disk drive of claim 9, wherein the controller searches for data in the buffer when the external apparatus requests the data, transmits the data to the external apparatus if the data exists in the buffer, searches for the data in the non-volatile cache if the data does not exist in the buffer, transmits the data to the buffer if the data exists in the non-volatile cache, and transmits the data from the hard disk to the buffer if the data does not exist in the non-volatile cache.

12. The hard disk drive of claim 9, wherein the external apparatus and the hard disk drive communicate through an advanced technology attachment (ATA) interface.

13. The hard disk drive of claim 9, wherein the non-volatile cache comprises:
   a flash memory.

\* \* \* \* \*